United States Patent [19]

Higgins et al.

[11] Patent Number: 5,272,766
[45] Date of Patent: Dec. 21, 1993

[54] OCR SYSTEM FOR RECOGNIZING USER-SPECIFIED CUSTOM FONTS IN ADDITION TO STANDARD FONTS USING THREE-LAYER TEMPLATES

[75] Inventors: Raymond L. Higgins, Kitchener; Dennis W. Golem, Waterloo, both of Canada

[73] Assignee: NCR Corporation, Dayton, Ohio

[21] Appl. No.: 865,790

[22] Filed: Apr. 7, 1992

Related U.S. Application Data

[63] Continuation of Ser. No. 640,615, Nov. 14, 1991, abandoned.

[51] Int. Cl.⁵ ............................................. G06K 9/62
[52] U.S. Cl. ...................................... 382/30; 382/34; 382/57; 382/14
[58] Field of Search ................... 382/7, 14, 30, 34, 57

[56] References Cited

U.S. PATENT DOCUMENTS

| | | | |
|---|---|---|---|
| 4,295,121 | 10/1981 | Enser et al. | 340/146.3 |
| 4,377,803 | 3/1983 | Lotspiech et al. | 382/9 |
| 4,415,880 | 11/1983 | Scott | 382/27 |
| 4,625,330 | 11/1986 | Higgins | 382/27 |
| 4,727,588 | 2/1988 | Fox et al. | 382/13 |
| 4,805,225 | 2/1989 | Clark | 382/15 |
| 4,879,753 | 11/1989 | El-Sherbini | 382/50 |
| 4,887,303 | 12/1989 | Hongo | 382/34 |
| 4,914,709 | 4/1990 | Rudak | 382/57 |
| 5,091,968 | 2/1992 | Higgins et al. | 382/30 |

FOREIGN PATENT DOCUMENTS

| | | | |
|---|---|---|---|
| 0035276 | 4/1981 | Japan | 382/57 |
| 0140880 | 8/1983 | Japan | 382/57 |
| 0276186 | 11/1988 | Japan | 382/57 |

OTHER PUBLICATIONS

Casey, "Manually-Assisted Adaptive Character Recognition System," *IBM Technical Disclosure Bulletin*, vol. 9, No. 9, Feb., 1967, pp. 1165-1166.

*Primary Examiner*—David K. Moore
*Assistant Examiner*—Andrew W. Johns
*Attorney, Agent, or Firm*—Robert S. Hulse

[57] ABSTRACT

An optical character recognition system is disclosed which is capable of recognizing out-of-specification characters and custom fonts, in addition to standard fonts such as E13B, OCRA, OCRB and Farington 7B type fonts recorded on documents such as bank drafts and checks. The standard fonts represent predefined characters, and the custom fonts and out-of-specification characters represent undefined characters. The system comprises an optical scanner, a microprocessor, a read-only-memory (ROM), a random-access-memory (RAM) with a stored program and predetermined template data, and a terminal with a keyboard and display unit. The scanner optically scans each document and produces a plurality of grey-scale pixel values which are stored in the RAM under control of the microprocessor. The microprocessor processes the stored pixel values, and effectively locates and segments each character on the document. In accordance with the predetermined template data, the microprocessor recognizes the segmented character if predefined, and rejects the segmented character if undefined. The rejected character is then displayed on the display unit for the user to see and identify. In response to identification provided (specified) by the user via the keyboard, the system develops a custom template or pattern representing (defining) the rejected character, and stores the custom template in memory for future use in recognizing the character.

6 Claims, 5 Drawing Sheets

| SAMPLE TEMPLATE | PATTERN WORD (HEX) | BIT SIG WORD (HEX) | WEIGHT WORD (HEX) |
|---|---|---|---|
| | 00 00 | F0 9F | 00 00 |
| | 00 00 | F0 07 | 00 00 |
| | 07 F0 | F7 F7 | 00 00 |
| | 07 F8 | F7 FF | 00 00 |
| | 00 38 | F0 3F | 00 00 |
| | 00 18 | FF 9F | 00 00 |
| | 00 18 | FF DF | 00 00 |
| | 00 18 | FF 9F | 00 00 |
| | 00 18 | FF 9F | 00 00 |
| | 00 38 | F0 3F | 00 00 |
| | 07 F8 | F7 FB | 60 E0 |
| | 07 F8 | F7 F9 | 60 E0 |
| | 00 7C | F0 7D | 00 00 |
| | 00 1C | FF 9D | 00 00 |
| | 00 1C | FF 9D | 00 00 |
| | 00 1C | FF DD | 00 00 |
| | 00 1C | FF DD | 00 00 |
| | 00 1C | FF 9D | 00 00 |
| | 00 3C | F8 3D | 00 00 |
| | 00 7C | F0 7D | 00 00 |
| | 07 FC | F7 FD | 00 00 |
| | 03 F8 | F3 F9 | 00 00 |
| | 00 00 | FF FF | 00 00 |

▨ SOLID BLACK

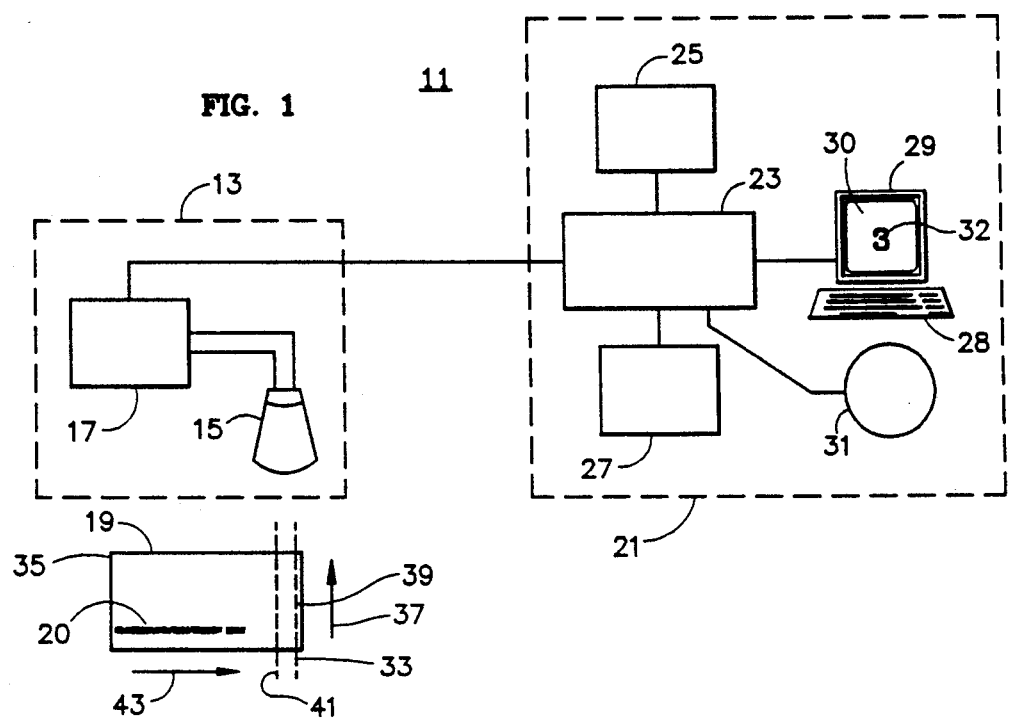
FIG. 1
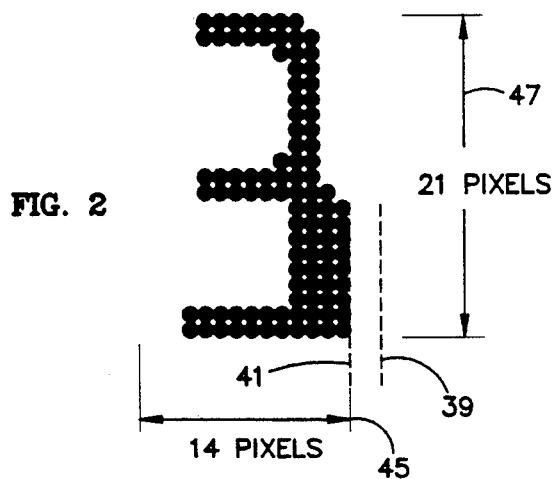
FIG. 2
⑈⑈1220002⑈7⑈⑈4961193220⑈⑈ 5647
FIG. 3

| SAMPLE TEMPLATE | PATTERN WORD (HEX) | BIT SIG WORD (HEX) | WEIGHT WORD (HEX) |
|---|---|---|---|
| | 00 00 | F0 9F | 00 00 |
| | 00 00 | F0 07 | 00 00 |
| | 07 F0 | F7 F7 | 00 00 |
| | 07 F8 | F7 FF | 00 00 |
| | 00 38 | F0 3F | 00 00 |
| | 00 18 | FF 9F | 00 00 |
| | 00 18 | FF DF | 00 00 |
| | 00 18 | FF 9F | 00 00 |
| | 00 18 | FF 9F | 00 00 |
| | 00 38 | F0 3F | 00 00 |
| | 07 F8 | F7 FB | 60 E0 |
| | 07 F8 | F7 F9 | 60 E0 |
| | 00 7C | F0 7D | 00 00 |
| | 00 1C | FF 9D | 00 00 |
| | 00 1C | FF 9D | 00 00 |
| | 00 1C | FF DD | 00 00 |
| | 00 1C | FF DD | 00 00 |
| | 00 1C | FF 9D | 00 00 |
| | 00 3C | F8 3D | 00 00 |
| | 00 7C | F0 7D | 00 00 |
| | 07 FC | F7 FD | 00 00 |
| | 03 F8 | F3 F9 | 00 00 |
| | 00 00 | FF FF | 00 00 |

SOLID BLACK

OCR SYSTEM FOR RECOGNIZING USER-SPECIFIED CUSTOM FONTS IN ADDITION TO STANDARD FONTS USING THREE-LAYER TEMPLATES

This is a continuation of co-pending application Ser. No. 07/640,615 filed on Jan. 14, 1991 now abandoned.

FIELD OF THE INVENTION

This invention relates generally to the optical scanning of documents and the recognition of alphanumeric character fonts, and particularly to recognition of user-specified custom fonts and out-of-specification (out-of-tolerance) characters.

BACKGROUND OF THE INVENTION

Many existing optical character recognition systems typically provide for optical scanning and recognition of familiar, widely used fonts. Generally, these fonts are predefined and accepted as a standard in the financial community, such as the American Bankers Association.

In such systems, the facility to recognize non-standard fonts, or to accommodate out-of-specification print problems and recognize characters with such problems is virtually non-existent. Generally, when a printed character is somewhat out-of-specification, recognition fails, the character is rejected, and the recognition operation is aborted, with consequent loss of valuable time and effort.

Also, other than providing for the recognition of standard characters, existing systems do not provide for optical character recognition of non-standard (custom) characters.

What is needed and would be useful, therefore, is an efficient and simple way of recognizing out-of-specification characters and custom characters.

SUMMARY OF THE INVENTION

Accordingly, an optical character recognition system is disclosed which is capable of recognizing out-of-specification characters and custom fonts that may be specified by a user.

The system, which provides for recognizing predefined characters recorded on a document, and for defining undefined characters such as custom fonts and out-of-specification characters for subsequent recognition, comprises an optical scanner, a memory, a processor, and an input and a display unit. The optical scanner optically scans the document and produces a plurality of grey-scale pixel values representing the characters. The memory, which includes a stored program and predetermined data, stores the pixel values. The processor, coupled to the scanner and memory, operates to locate and segment a character from among the stored pixel values. The processor, coupled to the scanner and memory, operates to locate and segment a character from among the stored pixel values, and to recognize the segmented character if predefined and reject the segmented character if undefined. The display unit is coupled to the processor for displaying an image of the rejected character, the image having a pattern of light and dark pixels. The input unit is coupled to the processor for entering the data to identify the rejected character.

The processor includes a means responsive to the entered data for developing a character count, the character count representing the number of scanned characters recognized as being similar to the user-specified definition, each recognized character having a light or dark pixel at each of a plurality of pixel positions. The processor also includes a means for developing a pixel count at each pixel position, each pixel count representing the number of times the pixel at that pixel position of the character was dark, and further includes a means for producing a template of light and dark pixels defining the rejected character, each pixel position of said template having a light or dark pixel depending on the magnitude of the corresponding pixel count relative to the character count.

BRIEF DESCRIPTION OF THE DRAWINGS

FIG. 1 is a block diagram of the system of the present invention, including a user terminal.

FIG. 2 is a graphic illustration of the appearance of a character scanable and identifiable by the system of FIG. 1;

FIG. 3 is a graphic illustration of a portion of a document with various characters recorded thereon;

DESCRIPTION OF THE PREFERRED EMBODIMENT

Figure 4:
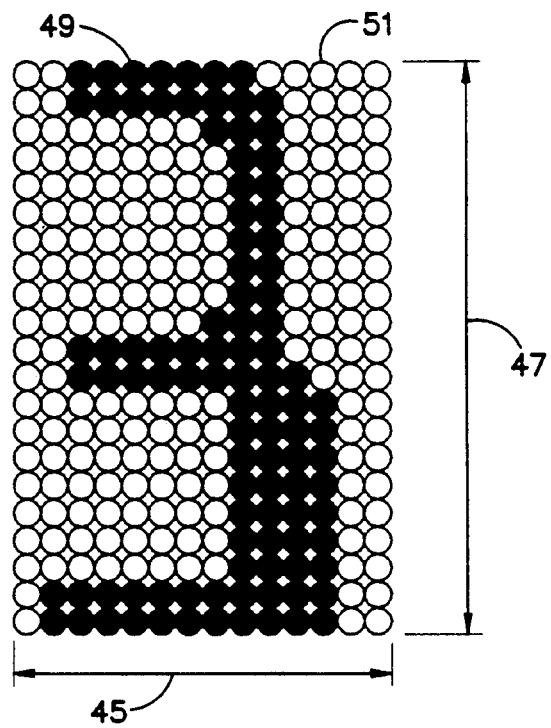
FIG. 4 is a graphic illustration of a scanned character having a matrix of pixels of different opacities (grey-scale values)

Referring now to FIG. 1, there is shown a system 11 of the present invention. The system includes and optical reader or scanner 13 for scanning a document 19, and a computer system (apparatus) 21 for processing data received from the scanner 13. The scanner may be a camera with a CCD (charge coupled device ) 15 and a controller 17, such as the Model TCD 132D linear image sensor system sold by Toshiba Corporation of Japan. The document 19 may be a bank draft or check with numeric character or alphanumeric symbol information 20 recorded thereon. The computer system 21 comprises a microprocessor 23, a ROM (read-only-memory) 25 with a boot program, and a RAM (random access memory with a stored program) 27, for storing data from the scanning device and from the microprocessor and for storing predefined data, a terminal 29 with a keyboard 28 and a CRT display 30, and an auxiliary storage unit 31 such as a disc drive with a database of image files of previously scanned documents. Apart from the capability of performing various scanning and processing operations on standard character fonts, as described in detail below with respect to the E13B type character, for example, the system also provides the capability of developing and processing user-specified custom fonts for optical character recognition as described further below under "Development of Custom Fonts for Optical Character Recognition".

Scanning and Recognition of Standard Fonts

The scanning operation is commenced at the bottom right corner 33 of the document 19 and ends at the top left corner 35. The scanner 13 scans the document 19 vertically, from bottom-to-top, as shown by arrow 37, first along right-most virtual scan line 39, then again from bottom-to-top along next-right-most virtual scan line 41, and so on until the top left corner of the document is reached. The virtual scan lines are arranged in parallel. The document 19 is moved continuously from left to right, as shown by arrow 43, while the scanner scans along successive scan lines, the width of each scan line corresponding to the diameter of a pixel (approximately 0.0127 cm or 0.005 inch).

An example of a read line of a document is shown in FIG. 3. When a document is scanned, the pixel values generated by the scanner to represent the document, including the characters thereon, are stored in memory 27 (FIG. 1). The characters of each read line are stored as a data array (matrix) having, for example, typically one hundred rows, corresponding to the read line's height, and twelve hundred columns corresponding to the document's length (twelve hundred being the typical number of columns for a six-inch document at 200 pixels per inch). Within the data array, a character (when one is located and segmented as described below) is represented by a matrix of rows (e.g., twenty-one, corresponding to the character's height) and columns (e.g., fourteen, corresponding to the character's width). The character "three" shown in FIG. 2, for example, may be represented in pixel array form as depicted in FIG. 4. Each pixel 49 represents a portion of the document and has an opacity index or gray-scale value in the range 0–255. The dark pixels generally have a greater gray-scale value (approaching 255), and the light pixels generally have a lesser gray-scale value (approaching 0). Since characters are normally printed in a dark color compared to the generally light colored background of the document, the difference in opacity between the character and its background is easily determinable.

Figure 5:
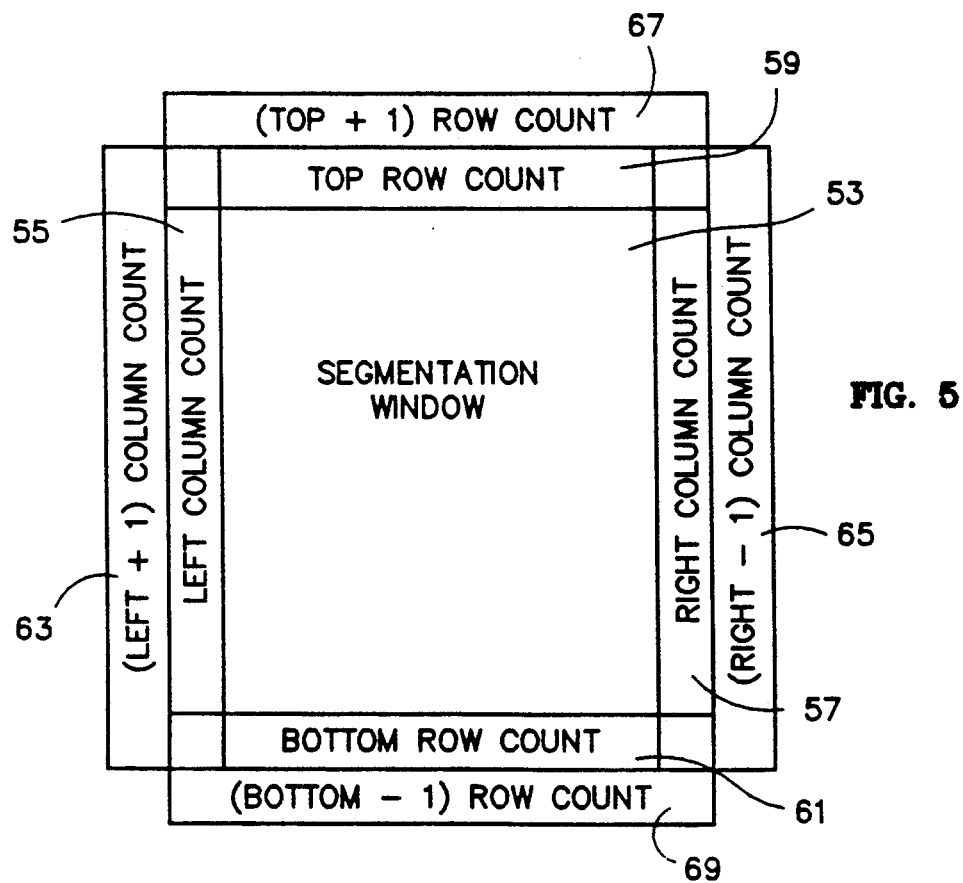
FIG. 5 is a graphic illustration of a window used for framing a character.

As indicated above, these gray-scale data values are generated by the scanner, upon scanning the document. The generated data are then stored in memory 27 (FIG. 1) for processing by the system 21. The system, under control of the stored program, examines the stored data values, and proceeds to locate a first character, then successive characters of a first field, then other characters of successive fields. Upon locating a character, the system proceeds to frame or delimit the character (i.e., to separate-out or segment the character from other characters). Starting with the stored gray-scale data values obtained from scanning the document from bottom-to-top along the right-most scan line 39 (FIGS. 1 and 2), and then from bottom-to-top along the next-right-most scan line 41, and so on, the system locates and frames (segments) each of the characters as described below. It does this by first searching the stored data for a rise in gray-scale value representing a transition from a light pixel to a dark pixel, vertically from bottom to top along the scan line. If a rise of more than, for example, forty (the particular value, such as forty, being font dependent) is found between two gray-scale values of adjacent pixels in the scan direction 37, a dark pixel is deemed to be found. The region (of the document) proximate to the dark pixel is regarded as a region where a character is likely to be found. When a dark pixel is found, the system checks the character region (i.e., checks the stored data proximate to the dark pixel value) to determine if the dark pixel is part of a character. It checks for the presence of a character by establishing a segmentation window of sufficient size to effectively frame the character on the document, the position of the dark pixel corresponding to the center of the window. As depicted in FIG. 5, a segmentation window 53 is shown having left and right edges (columns) 55, 57, and top and bottom edges (rows) 59, 61. Bordering the left and right edges are columns (left + 1) 63 and (right − 1) 65, and bordering the top and bottom edges are rows (top + 1) 67 and (bottom − 1) 69.

Figure 6:
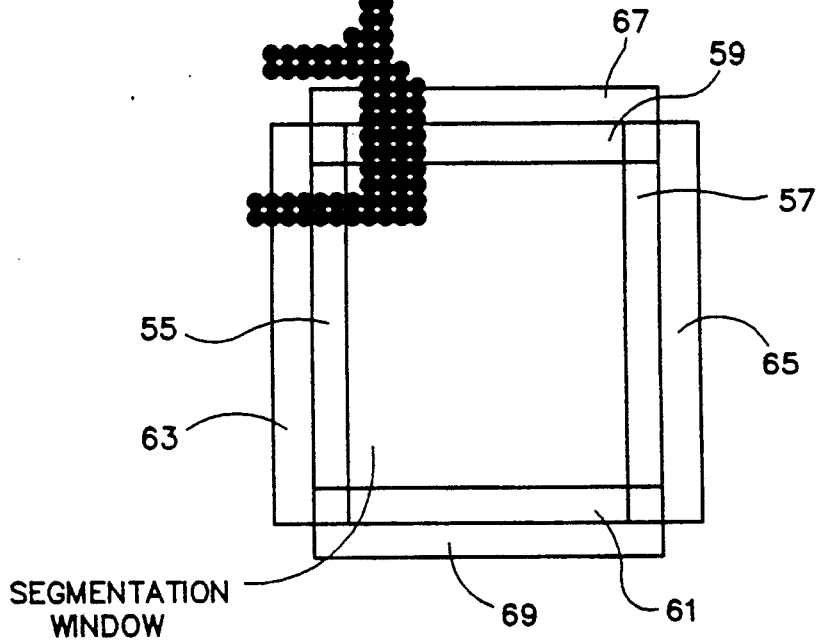
FIG. 6 is a graphic illustration of the window of FIG. 5 used in framing the character of FIG. 4.

As explained below with reference to FIGS. 5 and 6, a character is considered framed and positioned in the center of the window when the sum ($S_w$) of all the gray-scale pixel values in the window is maximum. To determine whether the sum ($S_w$) increases when the window is moved, the sums of the pixel values in each of the left and right columns 55, 57 and in each of their bordering columns 63, 65 are calculated. Likewise, the sums of the pixel values in each of the top and bottom columns 59, 61 and in each of their bordering columns 67, 69 are calculated. If, for example, the sum in column 63 is found to be greater than the sum in column 57, and would cause the sum ($S_w$) in the window to increase when the window 53 is moved by one pixel leftward to include column 63 and exclude column 57, then the window is moved leftward. Likewise, if by moving the window by one pixel upward to include row 67 and exclude row 61, the sum ($S_w$) in the window would increase, then the window is moved upward. Thus, from the sum (cumulative count) of the pixel values of the respective rows and columns adjoining (bordering) the window, relative to the sum of the pixel values of the respective rows and columns at the edges of the window, the direction can be determined in which the window can be moved to increase the sum ($S_w$) of the pixel values within the window. As shown in FIG. 6, according to the following counts:

Right − 1 column count = 0
Right column count = 0
Left column count = 100
Left + 1 column count = 100
Bottom − 1 row count = 0
Bottom row count = 0
Top row count = 170
Top + 1 row count = 170 the window count is increase by 100 upon a move leftward, and increased by 170 upon a move upward. Therefore, the window is moved leftward and upward. Thus, the window is moved in the direction which increases $S_w$, and this operation is repeated until no movement of the window in any of the four directions (left, right, up, down) increases $S_w$. The window is then considered to have framed (delimited/segmented) a character, with the character positioned at the center of the window. Thus, by means of the window a matrix of pixel values most representative of the character is selected (framed).

As a check to determine if there is enough information (dark-pixel gray-scale values) in the window to represent the framed character, the total number of pixels in the window that exceeds a predetermined confirmation threshold (e.g., a threshold gray-scale value of 100) is obtained. If the total number is greater than, for example, sixty (for the E13B font), then a character is confirmed to be found in the window. Otherwise, the object framed in the window is interpreted as noise, and the system proceeds to find the next character.

After segmentation, the segmented (framed) character is scaled in preparation for identification (recognition). Sixteen bit words are used in the recognition process (i.e., width of template is 16 pixels). Because many characters are wider than 16 pixels (including E13B characters which are 19 pixels wide), they are converted to 16 bits after segmentation. This is accomplished by eliminating predetermined columns e.g., for the E13B font, columns 4, 9 & 14 are eliminated. (OCRA and OCRB fonts are 16 pixels wide when scanned at two hundred pixels per inch, and do not need to have columns eliminated.)

The preceding describes how a character is located in preparation for processing, i.e., how it is effectively located on a document and framed (segmented) for later processing. The following describes how the framed character is converted to binary form then matched to a template (predetermined binary pattern) for the purpose of identifying (classifying/recognizing) the character.

Figure 7:
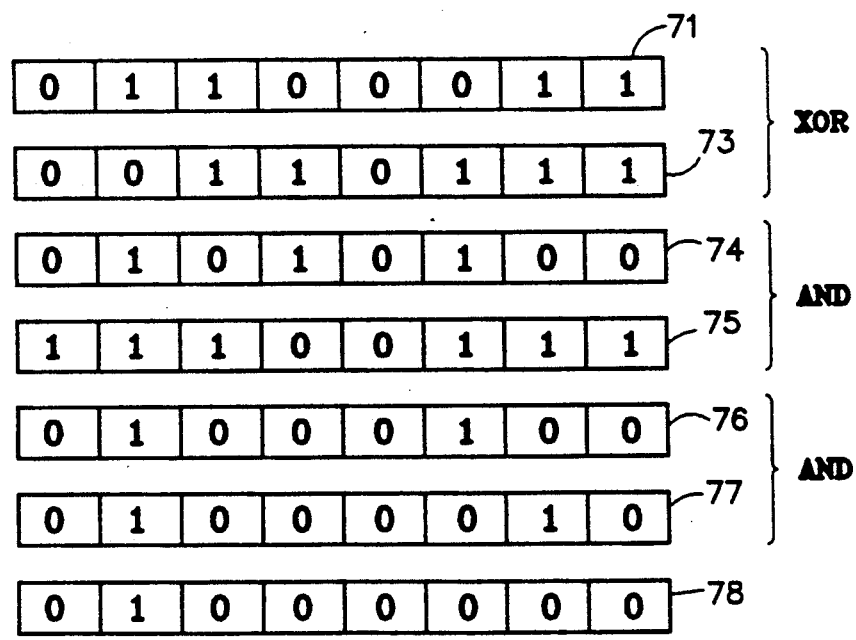
FIG. 7 is a block diagram showing the results of various logical operations performed on binary data representing the scanned character.

In the conversion operation, the stored gray-scale pixel values for each row of the framed character are converted to binary form. First a reference threshold value is calculated as the arithmetic mean of the dark pixels of the framed character (as previously described). Then, the gray-scale pixel values are converted to binary form relative to the reference threshold. For example, if the calculated reference threshold is one hundred, then, using the binary equivalent scale shown below:

| Gray-Scale Pixel Values | Binary Equivalent |
|---|---|
| ≧100 | 1 (black) |
| <100 | 0 (white) | a row of gray scale values of 80, 120, 130, 90, 85, 70, 110, 135 may be converted to binary data having the bit pattern 01100011 as shown in the eight-bit word 71 of FIG. 7.

This binary data (which represents a row or slice of the framed character) and other rows of converted binary data representing the character are then compared to a plurality of templates, each template corresponding to a character. Each template represents a predetermined pattern of binary data and comprises three distinct layers (bit configurations). The three eight- bit words 73, 75, 77 shown in FIG. 7 represent an eight-bit row in each of the three layers. The first layer (bit-pattern layer, corresponding to pattern word 73) represents the actual black/white (0/1) bit pattern of the character. The second layer (bit-significance layer, corresponding to bit-significance word 75) identifies the bit positions of the character that are significant and those that are not significant. One-bits identify significant bit positions where the bit pattern of the character is expected to remain unchanged regardless of small changes in size and shape of the character. Zero-bits identify nonsignificant bit positions where the bit pattern need not be the same for different sizes or shapes of the character. The third layer (bit-weight layer, corresponding to weight word 77) identifies which bits are critical, and hence have greater weight than others, in distinguishing between like (substantially similar) characters. In this third layer, 1-bits are designated as weighted bits, and 0-bits are designated as nonweighted bits. For example, 1-bits in the top row of the third layer of the template for the characters "O" and "U" would be useful in distinguishing between the two characters, and 1-bits in the bottom row of the third layer of the templates for the characters "Q" and "O" would be useful in distinguishing between the Q and the 0.

As shown in FIG. 7, various logic operations are performed by processor 23 (FIG. 1) on the binary data 71 in order to identify the character. (The logic operations are actually performed as sixteen-bit operations. However, for simplicity, eight-bit operations are shown). First, the binary data is EXCLUSIVE-OR'd with the corresponding word 73 of the bit-pattern layer to produce a pattern of mismatch 74 between the binary data 71 and the predetermined correct pattern 73. This mismatch pattern 74 is then logically ANDed with the corresponding word 75 of the bit-significance layer for producing a mismatch word 76, representing the extent of mismatch independent of character size and shape. The mismatch word 76 is then weighted, i.e., logically ANDed with the corresponding word 77 in the bit-weight layer to produce a weighted mismatched indicator 78. (If weighting word 77 contained no 1-bits, no weighting or ANDing would have been performed (in order to save processing time since the outcome would be zero), and the system would have proceeded with processing the next row of binary data.)

Following the weighting operation, a mismatch count ($MC_R$) is calculated for the row of binary data 71. This calculation is performed by processor 23 (FIG. 1) as follows:

$$MC_R = MC_w + (WOC \times WF)$$

(1) where,
  $MC_w$ represents a mismatch count for the mismatch word (i.e., the number of ones found in mismatch word 76),
  WOC represents a mismatch indicator or weight output count (i.e., the number of ones found in mismatch indicator word 78, and
  WF represents a predetermined weighing factor (e.g., the integer 2 for E13B type characters).

Thus, for the mismatch bit pattern shown in the words 76 and 78 in FIG. 7, it can be seen that $MC_2=2$, WOC=1, and WF=2. Therefore, the mismatch count ($MC_R$) calculated for the row of binary data 71 would equal four (i.e., $2+(1\times2)$ according to equation 1 above).

After calculating the mismatch count for one row, the system proceeds to calculate, as indicated above, the mismatch count for all remaining rows of the character. The mismatch counts for all the rows of the character are then summed to produce a template mismatch count (i.e., a mismatch count for the template as applied to the framed character). In a similar manner, for the other templates of the character set for the font being processed, a mismatch count is produced for each template relative to the framed character. The two lowest template mismatch counts and their associated template numbers are stored in memory as the various templates are processed. The criterion for identifying a character is: if the template with the lowest count is below a threshold (a reject threshold of 40 for E13B fonts) and is lower than the next lowest template by a predetermined amount (a difference threshold of 5 for E13B fonts), it identifies the character.

Figure 8:
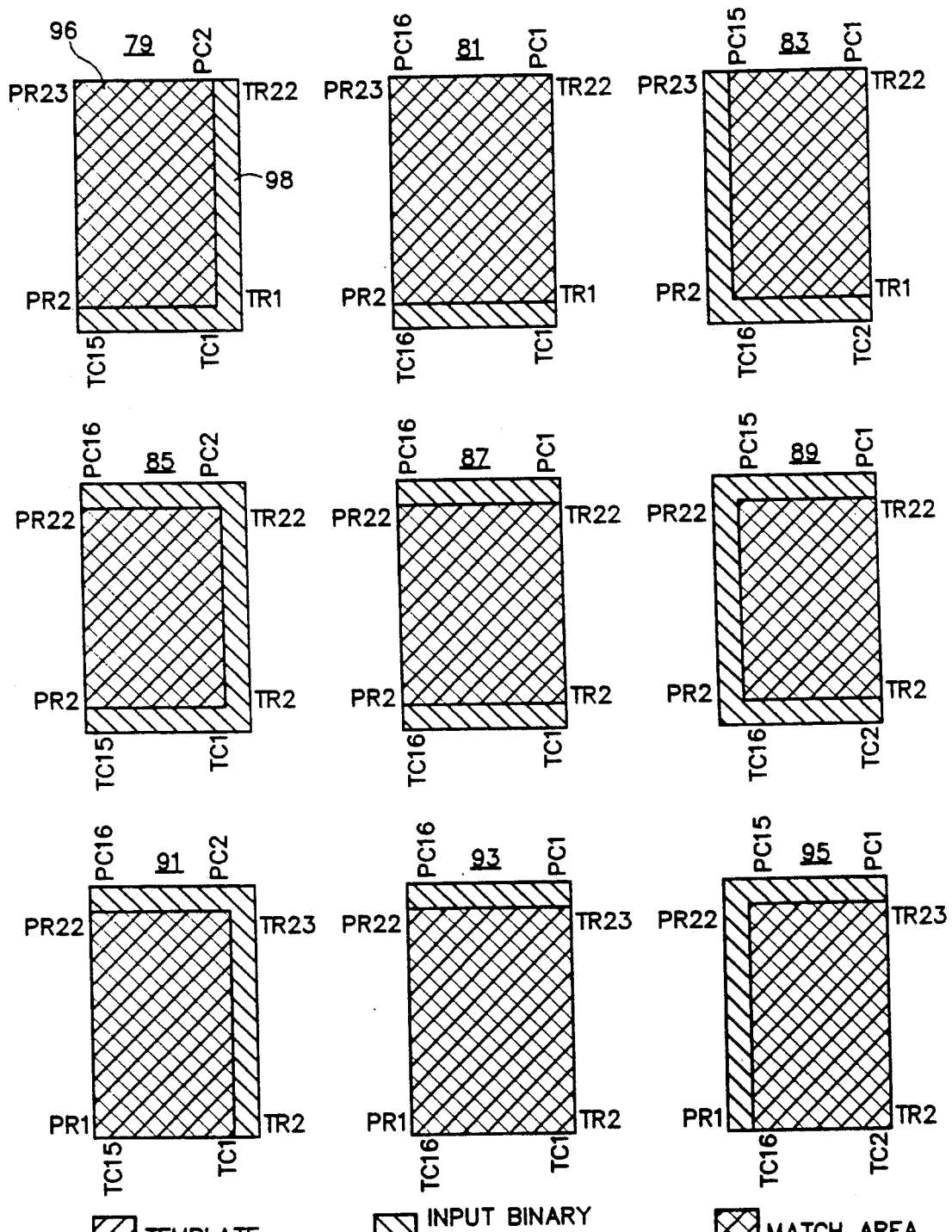
FIG. 8 is a block diagram of a matrix representing various positions of the image of a framed character.

Template recognition, as described previously, can be performed in a total of nine positions as shown in FIG. 8. This is done in order to identify characters that may not be perfectly framed due to factors like noise in the image. In the example shown in FIG. 8, the template and input (binary data) pattern sizes are 23 rows (high) by 16 columns (wide). The three layers of the template (pattern layer, bit significance layer and weighting layer) are all shifted (moved) the same amount and in the same direction. In the description of shift positions presented below, template row refers to the bit pattern row, bit significance row and bit weight row.

In the center position 87, the template 96 is placed directly over the input pattern 98. Only rows 2 through 22 are used in this match. Thus, template row 2 is compared to pattern row 2, and template row 3 is compared to pattern row 3, and so on. All columns (1 through 16) are used in the center horizontal positions 81, 87, 93. In the upper center position 81, rows 1 through 22 of the template are compared to rows 2 through 23 of the input pattern. This is the same as shifting the template pattern vertically upwards by one row. In this case, template row 1 is compared to input pattern row 2, template row 2 is compared to input pattern row 3 etc. All columns of the template and input pattern are compared in this situation (the horizontal center). Similarly, in the lower center position 93, the template is shifted down by one row, thus matching template rows 2 through 23 against input pattern rows 1 through 22.

The horizontal shift positions correspond to a shifting of the template 96 to the left or right over the input pattern 98. In the center left position 85, template columns 1 through 15 are used and input pattern columns 2 through 16 are used. (Since it is a center position vertically, rows 2 through 22 are used for both the input pattern and the template.) Thus, template word bit 1 is compared to pattern word bit 2, template word bit 3 is compared to pattern word bit 4, and so on. For example, if the template pattern layer word is:

0011111100001111 and the input character pattern word is:

0010111100011110

The template is shifted left 1 bit (column):

0011111100001111 and the result of the exclusive Or operation would be:

0101000100000000

It should be noted that when a shift left operation is performed, the rightmost bit (least significant bit, LSB) is 0. Thus, the LSB cf the bit-significant word will be 0 also (since all three layers are shifted in the same direction and amount) and, as such, the LSB of the mismatch word 76 (after the AND operation with the bit-significant word) will always be 0. Similarly, a shift to the right makes the leftmost bit (most significant bit, MSB) a 0 and, as such, the MSB of the mismatch word 76 (after the AND operation) will always be 0.

A horizontal shift to the right (position 89) is similar to the left shift, only in the opposite direction. Thus, bit 2 of the template word would line up with (be compared to) bit 1 of the input pattern word.

The corner positions (positions 95, 91, 83, 79) represent a combination of a vertical shift of one row and a horizontal shift cf one column. As an example, in the upper left position 79, the template row 1 is shifted left by one bit position and compared to pattern word 2, and template row 2 is shifted left by one bit position and compared to pattern word 3, and so on.

To recognize a character using this method requires nine passes per template times the number of templates in the character set. For example, an alphanumeric character set with 49 characters would require a total of 441 (9*49) matches being done. This can be too time consuming. To promote faster character identification, only the center position of each template is compared initially to the input pattern. The lowest two mismatch counts and their corresponding template numbers are stored in memory 27 as the various templates are processed. At the end of this first pass, the other eight positions of only these two templates are processed to find the best possible (i.e., lowest) total mismatch against the input pattern. Thus, only 65 (1*49+2*8) matches need to be made ordinarily (i.e., about 15% of the 441 matches that were required).

A description of the criteria for accepting or rejecting a character is presented below.

The lowest template mismatch count is compared to a predetermined reject threshold for the character that the template represents. If the template mismatch count for this character is below this threshold and the difference in template mismatch counts for the lowest two templates (second lowest mismatch minus lowest mismatch) is greater than a predetermined amount (e.g., 10), the template with the lowest template mismatch identifies the framed character. The reason for checking if the mismatch counts are too close is done to discriminate between characters that are very much alike (e.g., Q and 0). If the mismatches are similar, the character is rejected rather than risking a misidentification (misread). If no template mismatch falls below the reject threshold discussed above or the two template mismatch counts are too close together, a post processing operation (described below) is performed. If after the post-processing operation the framed character is still rejected, its image is enhanced and converted to binary form (as described below). The recognition process (described above) is then performed again. If the character is identified (satisfies the above criteria), the system then proceeds to process (locate and frame) the next character as described above.

By examining the center positions only, the possibility may be missed that a character, other than the closest two, may have a closer count in a position other than the center and be the correct choice. The post processing operation can remedy such a situation. If the lowest two characters chosen are both over the predetermined reject threshold for that individual character or the inter-character distance (second lowest mismatch-lowest mismatch) is too small, a number of other templates may be tested in the other eight positions in an attempt to find a better match. The choice of which templates to process is made, for example, based on the closest character's similarity to the templates. For example, the closest two characters (those with the lowest mismatch counts) chosen, the letters D and 0, both have mismatch counts above their individual reject threshold. In post processing operation, a predetermined set of characters that are similar to D and 0 would then be processed. This could include characters 0 (zero), Q, C and U. The mismatch counts of the closest two characters after this operation are checked (the one with the lowest mismatch count is checked first) to see if they meet the reject criterion and intercharacter distance criterion. If at least one character meets the criteria, that character is returned as the result, and processing (locating and framing) of the next character in the image proceeds.

If neither of the above characters meets the reject criteria, or the inter-character distance is too small, the framed character is rejected. In this case, its image is enhanced, (as described below), the character is rebinarized, and the recognition process described above is repeated a second time. If the character is recognized, it is returned. Otherwise, a reject character code is returned as the result, and processing (locating and framing) of the next character on the document continues.

In addition to the reject threshold described above, an exit threshold (e.g., the value 10) may also be used in the character identification process as described below. To enhance processing speed, successive template mismatch counts are compared to the exit threshold value, and the first template with a template mismatch count that falls below the exit threshold value would identify the character. In which event, the remaining templates are not processed (which enhances processing speed).

Further, to speed the character identification process, if, while the individual rows of a template are being processed, the mismatch count of the current template (i.e., the template currently being processed) is found to be larger than the second-lowest-count-obtained-thus-far, processing of the current template may be discontinued since this current template is no longer a contender to be one of the two with the lowest template mismatch counts. To further enhance recognition speed, the templates may be presequenced in the order in which they are most likely to occur (e.g., numbers before vowels followed by consonants in an alphanumeric font). If the mismatch is below the exit threshold (as mentioned above), the remainder of the templates need not be examined. Thus those characters occurring most frequently should be examined first. Also, to promote faster character identification, only the center position may be tested by the templates, after which, if the lowest template mismatch count is above the exit threshold, the remaining eight positions for each of the two templates closest to the exit threshold may be processed, and the template with the lowest template mismatch count selected as representative of the character. Further, to speed identification, the remaining eight positions (FIG. 8) may be processed in the following sequence 79, 81, 83, 85, 89, 91, 93, 95. This is the order in which the character is most likely to be positioned.

After identifying the framed character, the system proceeds to process the next character (i.e., to process the next group of stored pixel values representing the region on the document proximate to the framed character) by moving the segmentation window a selected number of pixels (e.g., three pixels) to the left of the previously framed character. The character in this proximate region is then framed (segmented) and identified as described above. All of the remaining characters (remaining stored pixel data) are processed in this manner until end-of-field is detected (i.e., no more characters have been located or an end-of-field character has been located).

If, during the character-identification process a character is rejected, its image is enhanced (as noted previously) to facilitate identification. The image may be enhanced, for example, by producing a character image having constant stroke widths (i.e., having a constant number of dark pixels across the width of each vertical stroke or horizontal stroke of the character). This is accomplished as described below. First, the gray-scale pixel values (e.g., 6-bit, 8-bit, or 16-bit values) representing the character are converted to a lesser range of values (e.g., 3bit gray-scale pixel values of the character image are examined and only those pixels that are the darkest two or three pixels of the stroke are turned black, others are turned white. This produces a binary image with constant stroke widths as described for example in U.S. Pat. No. 4,625,330 (incorporated by reference herein).

As an assist for improving character identification, the edges of each character may be processed as described below. As mentioned above, each template used in the character identification process corresponds to one character of the selected character set (e.g., the E13B character set) and, as shown in FIGS. 2 and 4, each character is fourteen pixels wide by twenty-one pixels high. One extra column is added to the left and to the right of the character, and one extra row is added to the top and to the bottom of the character. This results in a character size of 16 by 23. Corresponding to each character, each template is sixteen pixels wide by twenty-three pixels high. Each template has an extra column on each side (right side and left side) of the fourteen-column character, and one extra row on the top and an extra row on the bottom of the twenty-one-row character. Each extra row comprises sixteen white pixels, and each extra column comprises twenty-three white pixels. The extra rows and columns serve to surround the 14×21 character region with a border of white pixels for better identification of the edge portions of certain characters, as explained below. For example, if the character "E" is matched against a 14×21 "F" template, and the template is shifted upward one pixel position, the pixel values at the bottom of the "E" would be lost since it could not be used in generating the template mismatch count. This could result in mis-identification of the E as an F since the mismatch count would be low. With the 16×23 template, the bottom of the E would not be lost and would contribute substantially to the mismatch count against (relative to) the bottom white row of the F template, thereby avoiding mis-identification of the E as an F. A similar explanation holds with respect to the right and left column positions of the 16×23 template, the columns serve to reduce mis-identification between characters such as "B" and "3".

Figure 9:
FIG. 9 is a graphic/tabular illustration of a template and associated binary values used by the system of FIG. 1.

As shown in FIG. 9, each 16×23 template may be represented by sixty-nine sixteen-bit words of RAM 27 (corresponding to a scan of two hundred pixels per inch). Of the sixty-nine words, twenty-three represent first layer bit-pattern words, twenty-three represent second-layer bit-significance words, and twenty-three represent third-layer bit-weight words. Each set of twenty-three words correspond to the height of the character, and each sixteen-bit word correspond to the width of the character. (In FIG. 7, for simplicity, eight bits rather than sixteen bits are used to depict the logical operations.)

Development of Custom Fonts For Optical Character Recognition

In the foregoing, the recognition of standard character fonts (such as the E13B type font, for example) is described. In the following paragraphs, the recognition of user-specified custom fonts is described. More particularly, the development of templates by the system for defining (representing) user-specified custom fonts is described.

Following the scanning of a document and storage of the image in memory as scan data (grey-scale pixel values) as described previously, and before the processing of the stored data, selected routines of the stored program may be initialized described below. The routines enable the system to develop and process (segment and recognize) user-specified fonts, and are initialized upon entry of the following command via keyboard (or input device such as a mouse) 28 of terminal 29:

AUTOFONT OCRB D2001.GRY where AUTOFONT is the name of the program to be run, OCRB is the base name assigned to the font to be developed, and D2001.GRY is the name of the image file to be processed. The program AUTOFONT stored in memory 27 then enables the system to access the disk drive 31 and to open the file OCRB.FNT. If the file exists on the disc 31 its contents (template data) is input (read) into memory 27 and used, as described, in segmenting and identifying (recognizing) the scanned characters. If the file does not exist, the size of the characters that the system will be called upon to process must be specified (input) by the user. To enable the user to specify the required character size, the following menu is displayed by the terminal.

1. OCRA or OCRB character size
2. E13B character size
3. 7B character size
4. 10 char/inch, 6 lines/inch size
5. Enter size by pitch
6. Enter actual pixel size of character The user may then enter the number 1, 2, 3, 4, 5, or 6. In response to entry of 1, 2, 3, or 4 the system generates predetermined character sizes appropriate for the particular font (character type/style). For example, if 2 was entered, the character size of 17×24 pixels (i..e, 17 pixels wide by 24 pixels high, corresponding to a scaled-down template size of 16×26) would be used by the system for E13B type characters, as described previously. In expressing the character sizes associated with the menu selections, the system provides a resolution of 200 pixels/inch.

If the desired character size is not one of the standard ones, represented by menu selections 1-4, the user may specify a custom size by indicating the pitch (e.g., eight characters/inch) of the desired custom font. The user does this be entering the following information in the following input sequence:

1. User enters the number "5"System then displays "ENTER PITCH"
2. User enters the number "8" Alternatively, the user may specify the actual pixel size of the character (e.g., 12 pixels wide by 20 pixels high) by entering the following information in the following input sequence:
1. User enters the number "6" System then displays "ENTER CHARACTER HEIGHT"
2. User enters the number "20" System then displays "ENTER CHARACTER WIDTH"
3. User enters the number "20"

When the character size information has been input by the user, the system then builds an initial character set consisting of the numerics (characters 0 through 9) and their associated templates. (Initially, each of the bits in the bit-pattern layers of these templates are set to black(one), the bits in the bit-significance layer are set to all ones, and the bits in the weight layer are set to zeroes since no character has yet been detected). This is done since most fonts contain numeric characters.

The system then creates a statistics(Stats) file for each of the above defined characters. The Stats File consists of the following:

a 16-bit word (called a character-frequency word) containing the count of the number of times this character has been recognized. (This word is initialized to zero when created.)

two 8-bit words which hold the values of the height and width of the character, in pixels. (These words are initialized to the values input by the user, as described above.)

an array of sixteen-bit words (called bit-frequency words), one for each pixel position in the character. For example, a character with a height of 26 pixels and width of 16 pixels would have 26×16 or 416 of these words. (Note the width is always scaled to a maximum of 16 for recognition purposes.) These words are also initialized to zero at creation of the Stats File.

The system then segments and binarizes a character from the image (pixel data stored in memory) and performs the recognition process (i.e., passes the binarized character to the recognition routine) as described previously. If the character is recognized, the Stats File and template are updated as described below. If the character is not recognized (i.e., is rejected), the binary image of the character is displayed on the display 30 (FIG. 1) of terminal 29 along with the message "Enter Character:" inviting the user to indicate what he/she thinks the character is. The user then responds by entering a character (e.g., "3") via the keyboard 28. The system then checks to see if the character is a member of the character set. If not, the character is added to the character set and a corresponding template and Stats File are created.

At this point, the system knows what character the segmented pattern represents (e.g. "3") because it was either input by the user, or the recognition routine was able to recognize it because it was predefined. The Stats File for the character is then updated in the following manner. Fist, the character-frequency word is incremented. Then, each pixel position in the character pattern is checked. If the pixel is black (represented by a binary one), the corresponding bit-frequency word in the array is incremented. If the pixel is white (represented by a binary 0), the bit-frequency word is not updated. For example, if the pixel at row 12, column 15 is black, then the bit-frequency word representing that position would be incremented.

When the State File for the character has been updated, the template for that character (consisting of the bit-pattern layer, bit-significance layer and the bit-weight layer, as discussed previously) is also updated. The system builds the bit-pattern and bit-significance layers based on the Stats File contents. The count of the number of times a pixel was black(bit-frequency word) is compared to the number of patterns detected (character-frequency word).

If the bit-frequency value is found to be greater than, for example, ninety percent of the character-frequency value, the corresponding bit in the bit-pattern layer being built is set to one (black), and the corresponding bit in the bit-significance layer being built is set to one.

If the bit-frequency value is found to be less than, for example, ten percent of the character-frequency value, the corresponding bit in the bit-pattern layer being built is set to zero (white), and the corresponding bit in the bit-significance layer is set to one. If the bit-frequency value is within ten to ninety percent of the character-frequency value, the corresponding bit in the bit-pattern layer being built is set to zero and the corresponding bit in the bit-significance layer is set to zero. Likewise, for each remaining pixel of the displayed character, the corresponding bits of the bit-pattern layer and bit-significance layer being built (developed) are set to one or zero until development of these two layers of the template is complete.

Initially, all bits (pixels) of each bit-weight layer being developed are set to zero (no weighting).

When a document is finished being processed (i.e., after all characters on the read line have been processed), the weight layers for each template are updated as described below.

To determine if weighting is required, each template is compared to every other template in turn in the following manner. For example, let template 1 be the primary template and the rest be secondary templates. Initially, the weight layer of the primary template is set to zero, and one of the secondary templates is selected. The bit-pattern word in the selected secondary template is then EXCLUSIVE OR's with the bit-pattern layer of the primary template (similar to the type of operation shown in FIG. 7). The result of this operation is then ANDED with the bit-significance word of the primary template to give a mismatch count (as is done in the normal recognition process described previously). This process is performed for all the words in the template. If the total mismatch for the two templates is less than an inter-character threshold (e.g., 10) weighting is performed to tray to separate (distinguish) the mismatch counts for similar characters such as ) and Q. If the mismatch count is less than a post-process-thresholding (e.g., 40), the character that the secondary template represents is added to the list to post-process, as described previously with respect to the recognition process. The next secondary template is then processed as described above, until all of the secondary templates have been processed (developed). Then, a new primary template is selected and similar processing (as describe above) is performed until each template has been compared with all others.

If the total mismatch for two templates is less than the inter-character threshold mentioned, weighting is performed as follows. The pattern word from the primary template is EXCLUSIVE OR'd with the pattern word from the secondary template. The result of this operation is then ANDed with the bit-significance word of the secondary template, and the result of that operation is ANDed with the bit-significance word of the primary template to produce a third result. The 1 bits in this third result are both different and significant for the two templates. Thus, weighting of these bits would increase the mismatch count between the two templates. The weight word of the primary template is therefore OR'd with the final result. The same operation is performed for the rest of the words in the template.

Having developed bit-pattern, bit-significance, and bit-weight layers for each character, the system now has a complete set of templates. It then stores these newly developed templates on disc for later use to recognize characters in subsequent scanning and recognition operations.

A listing of the pseudo code of the stored program which enables the system to perform the logical and other processing operations described above is presented below.

```
PROCEDURE: MAIN
    If (font file exists)
        {
        LOAD_FONT_FILE
        }
    else
        {
        MAKE_NEW_FONT
        }
    while (NOT_END_OF_DOCUMENT)
        {
        if (FIND_FIRST_CHARACTER) finds a character
            {
            RECOGNIZE FIELD
            }
        else
            {
            END_OF_DOCUMENT
            }
        }
    UPDATE_POST_PROC
    UPDATE_TEMPLATE_WEIGHTS
    SAVE_FONT
PROCEDURE: MAKE_NEW_FONT
    GET_CHARACTER_SIZE
    INITIALIZE_CHARACTER_SET
    INITIALIZE_TEMPLATES
    INITIALIZE_STATS_FILES
PROCEDURE: FIND_FIRST_CHARACTER
    do
        {
        SCAN_IMAGE_FOR_WHITE_TO_BALCK_TRANSITION
        }
    until (FOUND_CHARACTER or END_OF_DOCUMENT)
PROCEDURE: RECOGNIZE FIELD
    do
        {
```

```
            -continued
        RECOGNIZE_CHARACTER
        if(reject)
            {
            GET_CHARACTER_FROM_KEYBOARD
            }
        if (character ! = "?")
            {
            if (character_NOT_in_character_set)
                {
                UPDATE_CHARACTER_SET
                }
            UPDATE_STATS_FILE
            UPDATE_TEMPLATE_FILE
            UPDATE_FONT_TABLE
            }
        MOVE_TO_NEXT_CHARACTER_POSITION
        }
    while(FOUND_CHARACTER)
PROCEDURE: RECOGNIZE CHARACTER
    BINARIZE_CHARACTER_IMAGE
    TEMPLATE_RECOGNITION_OF_CHARACTER
    if(character_is_rejected)
        {
        ENHANCE_AND_REBINARAIZE_CHARACTER_IMAGE
        TEMPLATE_RECOGNITION_OF_CHARACTER
        }
```

While the present invention is susceptible of embodiment in various forms, there is shown in the drawings and described in the specification a presently preferred embodiment, with the understanding that the present disclosure is to be considered as an exemplification of the invention, and is not intended to limit the invention to the specific embodiment illustrated.

What is claimed is:

1. In an optical character recognition system capable of scanning and recognizing characters from a document, a method of representing an unrecognized character to enable subsequent recognition by the system, the method comprising the steps of:

displaying an image of the unrecognized character, said image having a pattern of light and dark pixels;

inputting a user-specified character for identifying the unrecognized character;

developing a character count, said character count representing the number of scanned characters recognized as being similar to the user-specified character, each recognized character having a light or dark pixel at each of a plurality of pixel positions;

developing a pixel count at each pixel position, each pixel count representing the number of times a dark pixel is detected at said pixel position in the recognized characters similar to the user-specified character; and producing a three layer template having first, second, and third layers, with said first, second, and third layers corresponding to first, second, and third bit configurations, respectively;

said first bit configuration representing the dark and light pixels in said plurality of pixel positions;

said second bit configuration representing a predetermined significance of respective pixels in said plurality of pixel positions; and said third bit configuration representing weighted values of respective pixels in said plurality of pixel positions.

2. Method of defining a character recognizable by an optical character recognition system, the method comprising the steps of:

scanning the character and producing a plurality of grey-scale pixel values for use in recognizing the character;

displaying an image of the scanned character, the scanned character being initially unrecognized by the system;

providing a user-specified character identifying said image;

developing a character count representing the number of scanned characters recognized as being similar to the user-specified character;

determining the frequency of occurrence of selected pixels of the displayed image in characters recognized as being similar to the user-specified character;

determining the ratio of said count to said frequency; and constructing a template having a pattern of light and dark pixels corresponding to said ratio, the template representing a definition of the character for use in recognizing the character said step of constructing said template including the steps of:

producing a bit-pattern layer representing an actual bit-pattern of the unrecognized character;

producing a bit-significance layer for identifying significant bit positions of the bit-pattern that remain significantly unchanged despite small changes in the size or shape of a character; and producing a bit-weight layer for identifying which bits of the bit-pattern have greater weight than others in distinguishing between substantially similar characters;

said bit-pattern layer, said bit significance layer and said bit-weight layer forming a three layer template for use in recognizing the character.

3. In an optical character recognition system capable of scanning and recognizing characters from a document and rejecting unrecognized characters, an apparatus for representing an unrecognized character to enable subsequent recognition by the system, the apparatus comprising:

means for displaying an image of the unrecognized character, said image having a pattern of light and dark pixels;

input means for entering data representing a user-specified character for identifying the unrecognized character;

means responsive to the entered data for developing a character count, said character count representing the number of scanned characters recognized as being similar to the user-specified character, each recognized character having a light or dark pixel at each of a plurality of pixel positions;

means for developing a pixel count at each pixel position, each pixel count representing the number of times of dark pixel is detected at said pixel position in the recognized characters similar to the user-specified character; and means for producing a three layer template having first, second, and third layers, with said first, second, and third layers corresponding to first, second, and third bit configurations, respectively;

said first bit configuration representing the dark and light pixels in said plurality of pixel positions;

said second bit configuration representing a predetermined significance of respective pixels in said plurality of pixel positions;

said third bit configuration representing weighted values of respective pixels in said plurality of pixel positions.

4. Optical character recognition system for recognizing predefined characters recorded on a document, and for defining undefined characters such as custom fonts and out-of-specification characters for subsequent recognition, the system comprising:

means for optically scanning the document and producing a plurality of grey-scale pixel values representing the characters;

memory means, including a stored program and predetermined data, for storing the pixel values;

processing means coupled to the scanning and memory means for locating and segmenting a character from among the stored pixel values, and for recognizing the segmented character if predefined and rejecting the segmented character if undefined;

display means coupled to the processing means for displaying an image of the rejected character, said image having a pattern of light and dark pixels; and input means coupled to the processing means for entering data identifying the rejected character;

said processing means including;

a means responsive to the entered data for developing a character count, said character count representing the number of scanned characters recognized as being similar to the user-specified definition, each recognized character having a light or dark pixel at each of a plurality of pixel positions;

a means for developing a pixel count at each pixel position, each pixel count representing the number of times a dark pixel is detected at said pixel position in the recognized character similar to the user-specified character; and a means for producing a three layer template having first, second, and third layers, with said first, second, and third layers corresponding to first, second, and third bit configurations, respectively;

said first bit configuration representing the dark and light pixels in said plurality of pixel positions;

said second bit configuration representing a predetermined significance of respective pixels in said plurality of pixel positions; and said third bit configuration representing weighted values of respective pixels in said plurality of pixel positions.

5. In a character recognition system capable of scanning and recognizing standard font characters from a document, a method for using said system to recognize non-standard font characters, with each said standard font character and non-standard font character being represented by a matrix of dark and light pixels, said method comprising the steps of:

(a) indicating from said non-standard font characters the size of the matrix of a non-standard font characters that cannot be read by said character recognition system and identifying said non-standard font character;

(b) representing said non-standard font character from step (a) by a three layer template having first, second, and third layers, with said first, second, and third layers corresponding to first, second, and third bit configurations, respectively;

said first bit configuration representing the dark and light pixels in said matrix;

said second bit configuration representing a predetermined significance of respective pixels in said matrix; and said third bit configuration representing weighted values of respective pixels in said matrix;

(c) repeating steps (a) and (b) for a number of samples and storing the resulting data in a file for said non-standard font character until a user of said character recognition system is confident that the number of samples taken will provide a degree of performance required by said system; and (d) transferring said file to said character recognition system to be used by said character recognition system in recognizing said non-standard font character.

6. The method as claimed in claim 5 in which said method further comprises the step of:

(e) repeating said steps (a), (b), (c), and (d) for the characters remaining in said non-standard font.

* * * * *

UNITED STATES PATENT AND TRADEMARK OFFICE
CERTIFICATE OF CORRECTION

PATENT NO. : 5,272,766
DATED : December 21, 1993
INVENTOR(S) : Raymond L. Higgins et al.

It is certified that error appears in the above-identified patent and that said Letters Patent is hereby corrected as shown below:

Column 17, line 15, "of" should be --a--.

Column 18, line 27, "ters" should be --ter--.

Signed and Sealed this

Fourteenth Day of June, 1994

Attest:

BRUCE LEHMAN

*Attesting Officer*    *Commissioner of Patents and Trademarks*